United States Patent [19]
Bailis

[11] Patent Number: 5,999,998
[45] Date of Patent: Dec. 7, 1999

[54] ISA ADAPTOR CARD

[76] Inventor: Jason Bailis, 40 Bridle Path La., Novato, Calif. 96945

[21] Appl. No.: 09/089,243

[22] Filed: Jun. 2, 1998

Related U.S. Application Data

[60] Provisional application No. 60/048,437, Jun. 2, 1997.
[51] Int. Cl.$^6$ ..................................................... G06F 13/00
[52] U.S. Cl. ........................ 710/103; 710/101; 710/102; 713/300; 713/330; 713/340
[58] Field of Search .................................... 395/283, 281, 395/282, 882, 750.01, 750.07, 750.08; 710/103, 101, 102, 62; 713/300, 330, 340

[56] References Cited

U.S. PATENT DOCUMENTS

| | | | |
|---|---|---|---|
| 4,375,308 | 3/1983 | Wilkinson | 439/76.1 |
| 4,913,511 | 4/1990 | Tabalba et al. | 350/96.2 |
| 5,473,499 | 12/1995 | Weir | 361/58 |
| 5,568,610 | 10/1996 | Brown | 395/185.01 |
| 5,572,395 | 11/1996 | Rasums et al. | 361/58 |
| 5,799,165 | 8/1998 | Favor et al. | 395/390 |

*Primary Examiner*—Ayaz R. Sheikh
*Assistant Examiner*—Ario Etienne
*Attorney, Agent, or Firm*—Rogers & Killeen

[57] ABSTRACT

Use of ISA Adapter Card (ISAAC) to insure timing of application of power and logic to ISA, SCSA and MVIP Cards when those cards are plugged into standard ISA connectors of the ISAAC and the ISAAC is subsequently plugged into an active ISA, SCSA, and/or MVIP bus(es) such that any server connected to the back plane does not have to be shut down to protect ISA, SCSA and MVIP cards when inserted and removed from the back plane.

4 Claims, 3 Drawing Sheets

ISA ADAPTOR CARD

FIELD OF THE INVENTION

This application claims the benefit of U.S. Provisional Application No. 60/048,437 filed Jun. 2, 1997, the disclosure of which is incorporated herein by reference.

The present invention relates to an adaptor or interface circuit for connecting a PC expansion card to a bus without deactivating or removing the power therefrom.

BACKGROUND OF THE INVENTION

There are several standard busses in use in computer telephony circuits. Among them are the Industry Standard Architecture or ISA bus commonly used as an expansion bus in personal computers, the Signal Computing System Architecture or SCSA bus and the Multi-Vendor Integration Protocol or MVIP voice bus and switching protocol for transmitting signals, voice and video from one PC expansion card to another.

Connections between an expansion card and a bus are generally made by edge connectors located on the cards so that the connection of the card to a corresponding receptacle on the bus establishes both power connections to the electrical components on the card and general purpose signal connections (e.g. for data and addresses).

It has generally been necessary to deactivate or remove power from such a bus during the installation of a card. The physical insertion of the card into the bus generated noise on the bus which often proved deleterious to other cards resident on the bus. For example, data being transmitted along the bus to and from the microprocessor and other cards could be lost during insertion of the new card.

For achieving hot pluggability, it is generally required that the power and signal connections are made in a certain order, i.e., generally the power connections are established before the signal connections. For this reason, cards being installed were susceptible of damage from the application of power to the various portions thereof in an order incompatible with the circuit of the card. Further, the boards already operational on the bus or the card may be damaged as a result of temporary electrical disturbances created by the act of connecting the card to the bus. Such disturbances may also create problems on the bus as the result of electromagnetic interference and regulated voltage levels on the bus may fall out of specification severely affecting other cards connected to the bus.

The connection of a card to a bus without deactivating the bus is generally referred to as "hot pluggable", i.e., the card may be "plugged" into the bus while the bus remains "hot" or active.

Many of the above problems also exist upon the physical removal of an card containing active elements from the bus.

Hot pluggable connections between cards and a motherboard have been developed in which it is not necessary to deactivate the bus during insertion of a new card. One such method is disclosed and claimed in the Weir U.S. Pat. No. 5,473,499 assigned to the assignee of the present invention. As disclosed in the Weir patent, an adaptor or interface circuit is physically connected to the bus and cards are thereafter plugged into the adaptor card, with the adaptor card containing circuitry which sequentially connected ground buses on the card before the power busses, with the application of power to the power busses being initially limited.

In contrast to the use of an adaptor card connected to the bus of a personal computer into which standard protocol and architecture cards may thereafter be plugged, the present invention relates to an adaptor card into which one of the standard cards may be plugged, with the adaptor and card combination thereafter plugged into the computer bus.

Accordingly, it is an object of the present invention to provide a novel adaptor and method by which telephony standard cards such as ISA-, SCSA-, and MVIP-busses may be made hot pluggable.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
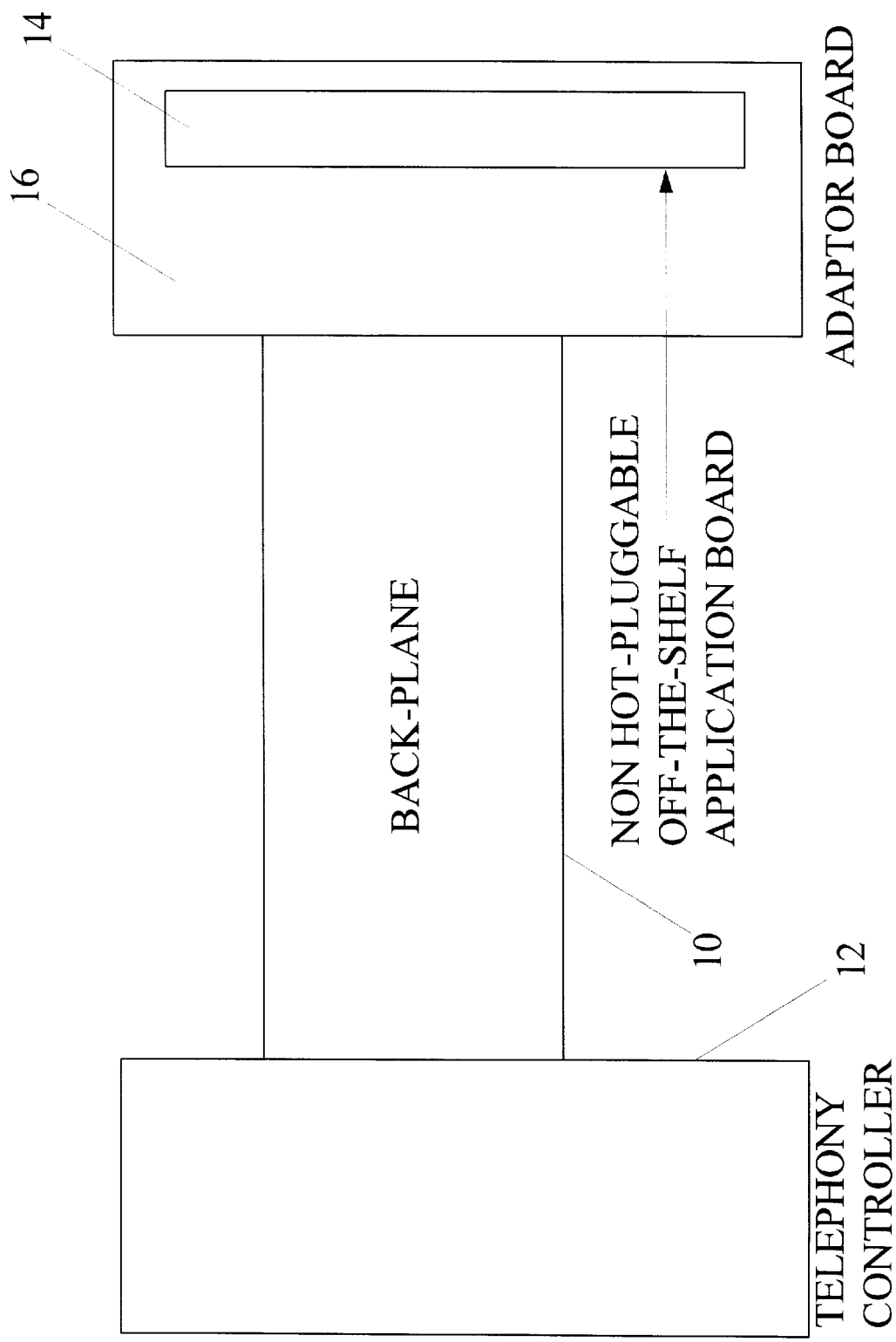
FIG. 1 is a schematic of one embodiment of a system for connecting a telephony (SCSA and MVIP) standard bus to an enabled back plane of a telephone switch in an enhanced services platform.

FIG. 1 shows the back plane 10 of a telephone switch 12 such as the Harris 20—20 Switch to which it is desired to plug an expansion card 14 such as the commercially available and well known SCSA or MVIP telephony cards. As shown in FIG. 1, the expansion card 14 is connected to the back plane 10 through an ISA adaptor card ("ISAAC") 16 of the present invention.

Figure 2:
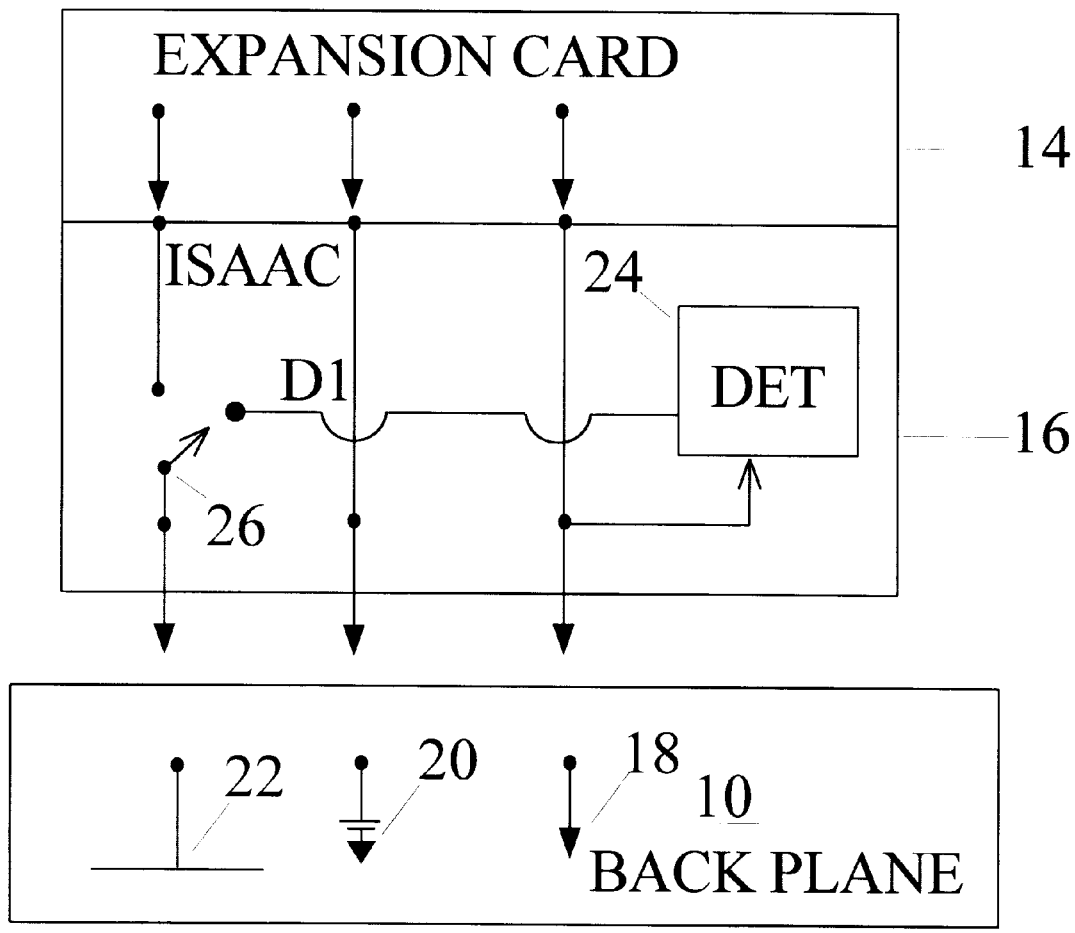
FIG. 2 is a schematic circuit diagram of one embodiment of the system of FIG. 1.

In operation, and with reference to FIG. 2, the back plane 10 has a ground bus 18, a power bus 20 and a signal or general purpose bus 22, and the back plane 10 is provided with a suitable conventional receptacle (not shown) to receive the pins of a card.

With continued reference to FIG. 2, the pins of the ISAAC 16 are desirably of variable length, i.e., the longest pins are associated with the ground bus on the ISAAC, the next longest pins are associated with the power bus on the ISAAC 16, and the shortest pins are associated with the signal bus on the ISAAC 16. In this way, the ground bus of the ISAAC is connected to the corresponding bus of the back plane prior to the power bus, followed by the signal bus.

The ISAAC 16 contains a power detector 24 which detects the insertion of the ISAAC 16 into the receptacle of the back plane 10, e.g., by detecting the connection of the power bus of the back plane to the power bus on the ISAAC 16.

Upon detection of the insertion of the ISAAC 16 into the receptacle of the back plane 10, semiconductor switch 26 in the ISAAC is opened to isolate the signal bus of the ISAAC 16 from the corresponding bus of the back plane 10 for a predetermined period of time. The delay D1 in the closing of the switch 26 to connect the signal bus is sufficiently long to prevent transient signals resulting from the application of power to the power bus of the ISAAC 16 from interfering.

Alternatively, the detector 24 and switch 26 may be replaced by suitable conventional power-on reset circuit or micropower supply voltage supervisor IC which detects the connection and provides the necessary delay.

Figure 3:
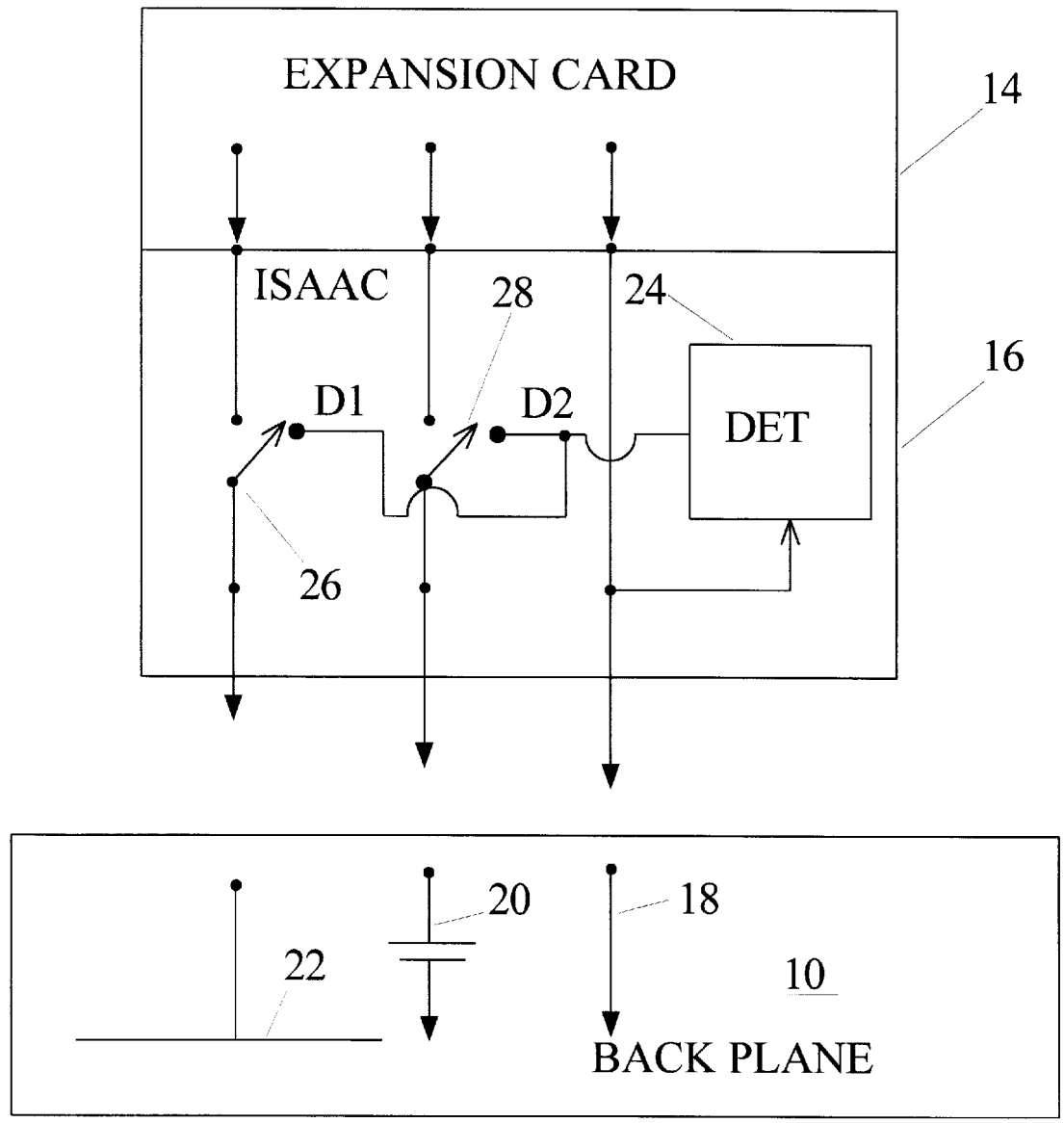
FIG. 3 is a schematic circuit diagram of another embodiment of the system of FIG. 1.

In a further embodiment of the present invention shown in FIG. 3, an additional switch 28 may be included in the ISAAC circuitry to isolate the power bus of the ISAAC 16 from the power bus of the back plane 10 for a predetermined period of time. The delay D2 in the closing of the switch 28 to connect the power bus is sufficiently long to prevent transient signals from resulting from the insertion of the ISAAC and is desirably about 250 milliseconds. In this embodiment, the delay D1 in the closing of the switch 26 to connect the signal bus is desirably about 300 milliseconds longer than the delay D2. As discussed above, the switches 26 and 28 may be replaced by a conventional power-on reset circuit.

Since the expansion card 14 is plugged into the ISAAC prior to the plugging of the ISAAC 16 into the back plane 10, the connection of a bus of the back plane to the bus of the ISAAC is the connection of the back plane 10 to the associated bus of the expansion card 14. By virtue of the controls established by the ISAAC 16, a non-hot pluggable expansion card 14 may be connected to the back plane 10 without removing power from the back plane and disrupting the operation thereof.

Removal of the expansion card is accomplished by removal of the ISAAC from the back plane, and the subsequent removal of the expansion card from the ISAAC. Upon the removal of the ISAAC, the signal bus is first disconnected because of the short pin length, followed by the power bus and then the ground bus.

What is claimed is:

1. In a system including a telephone switch having a back plane with a variable length pin receptacle, a method of connecting an expansion card to the busses thereof without removing power therefrom comprising the steps of:
   (a) providing a conventional ISA-to-telephony standard expansion (SCSA or MVIP) card;
   (b) providing an adaptor card with variable length pins capable of being received into the receptacle of the back plane and having an ISA standard receptacle for receiving a conventional ISA-to-telephony standard expansion (SCSA or MVIP) card;
   (c) connecting the expansion card to the adaptor card though the ISA standard receptacle;
   (d) detecting the insertion of the adaptor card into the receptacle of the said back plane,
   (e) immediately connecting the ground bus of the expansion card to the ground bus of the back plane through the ground bus of the adaptor card, and
   (f) delaying the connection of the signal bus of the back plane to the signal bus of the expansion card for a first predetermined period of time,
   whereby a non-hot pluggable expansion card may be connected to the back plane without the removal of power from the back plane.

2. The method of claim 1 further comprising delaying the connection of the power bus of the back plane to the power bus of the expansion card for a second predetermined period of time shorter than the first predetermined period of time.

3. In a system including a telephone switch having a back plane with a variable length pin receptacle, a method of connecting an expansion card to the busses thereof without removing power therefrom comprising the steps of:
   (a) providing an expansion card;
   (b) providing an adaptor card with variable length pins capable of being received into the receptacle of the back plane and having a receptacle for receiving an expansion card;
   (c) connecting the expansion card to the adaptor card though the receptacle;
   (d) detecting the insertion of the adaptor card into the receptacle of the said back plane,
   (e) immediately connecting the ground bus of the expansion card to the ground bus of the back plane through the ground bus of the adaptor card, and
   (f) delaying the connection of the signal bus of the back plane to the signal bus of the expansion card for a first predetermined period of time,
   whereby a non-hot pluggable expansion card may be connected to the back plane without the removal of power from the back plane.

4. The method of claim 3 further comprising delaying the connection of the power bus of the back plane to the power bus of the expansion card for a second predetermined period of time shorter than the first predetermined period of time.

* * * * *